United States Patent [19]

Skillen et al.

[11] Patent Number: 4,649,668

[45] Date of Patent: Mar. 17, 1987

[54] SEALING ELEMENT FOR FLUSH MOUNTED MOVABLE AUTOMOBILE WINDOW

[75] Inventors: John D. Skillen, Keokuk, Iowa; Melvin S. Coons, Marion, Ind.; Olav H. Brannstrom, Troy, Mich.

[73] Assignee: Sheller-Globe, Inc., Toledo, Ohio

[21] Appl. No.: 826,762

[22] Filed: Feb. 6, 1986

[51] Int. Cl.⁴ .............................................. B60J 5/04
[52] U.S. Cl. ........................................ 49/374; 49/441; 49/502
[58] Field of Search ............... 49/374, 502, 440, 441, 49/376, 377, 378, 227

[56] References Cited

U.S. PATENT DOCUMENTS

| | | | |
|---|---|---|---|
| 4,196,546 | 4/1980 | Bright | 49/440 X |
| 4,240,227 | 12/1980 | Hasler et al. | 49/374 X |
| 4,357,781 | 11/1982 | Ohya et al. | 49/227 |
| 4,454,688 | 6/1984 | Rest et al. | 49/440 X |
| 4,470,223 | 9/1984 | Mesnel | 49/441 |
| 4,561,211 | 12/1985 | Raley et al. | 49/374 |
| 4,571,888 | 2/1986 | Jensen | 49/374 X |

FOREIGN PATENT DOCUMENTS

| | | |
|---|---|---|
| 0040587 | 11/1981 | European Pat. Off. . |
| 0040588 | 11/1981 | European Pat. Off. . |
| 0061027 | 9/1982 | European Pat. Off. . |
| 3140140 | 10/1981 | Fed. Rep. of Germany . |
| 3236168 | 9/1982 | Fed. Rep. of Germany ........ 49/374 |
| 2283299 | 3/1976 | France . |
| 2085513 | 4/1982 | United Kingdom ................. 49/441 |

Primary Examiner—Philip C. Kannan
Attorney, Agent, or Firm—Schwartz, Jeffery, Schwaab, Mack, Blumenthal & Evans

[57] ABSTRACT

The sealing element comprises a first generally U-shaped member having an outer wall and an inner wall. The outer wall is shaped sustaining to form an outer guide for a movable vehicle window. A second generally U-shaped member is provided having a pair of legs which are spaced by a distance sufficient to receive the inner wall of the first U-shaped member and a mounting flange in order to clamp the inner wall and the mounting flange together. A second embodiment of the invention is disclosed in which a single S-shaped member is formed partly from a soft material with a hard core and partly from a hard, shape sustaining material.

22 Claims, 12 Drawing Figures

SEALING ELEMENT FOR FLUSH MOUNTED MOVABLE AUTOMOBILE WINDOW

BACKGROUND OF THE INVENTION

1. Field of the Invention

This invention relates to sealing elements for automobiles and more particularly to sealing elements for flush mounted vehicle windows.

2. Discussion of Related Art

In the design of modern automobiles, it is well known that a low coefficient of drag of the vehicle body provides enhanced performance and reduced fuel consumption. Thus, one constraint of modern design engineers is the coefficient of drag figure. In order to reduce the drag coefficient, vehicle windows may be designed to be flush or substantially flush with the outer surface of the vehicle body. However, it is very difficult to seal a flush mounted movable window against the elements. It is therefore desirable to have some type of outer window guide member to prevent the window from moving away from the vehicle body leaving air gaps. However, at the same time, any such outer guide member must be relatively thin so that the window will still be substantially flush mounted. Further, the outer guide member must be easily mounted to the vehicle.

SUMMARY OF THE INVENTION

One object of the present invention is to provide a sealing element for a flush mounted movable vehicle window which will provide a positive seal against the window by inhibiting outward movement of the window, yet permit a substantially flush window configuration.

Another object of the present invention is to provide a sealing element for flush mounted windows which provides an exterior appearance which is aesthetic.

A further object of the present invention is to provide a sealing element for flush mounted windows in which the outer members for a window or a group of windows is formed as an integral modular unit with a plurality of inner sealing members attached to the integral unit to complete the sealing element.

A still further object of the present invention is to provide a sealing element having a relatively rigid outer member with a soft sealing lip which is attached to the outer member either by being molded into the material of the outer member or by being attached through a post-assembly process.

In accordance with the above and other objects, the present invention is a sealing element for a flush mounted window of an automobile, comprising a first generally U-shaped member having an outer wall and an inner wall. The outer wall is formed of a shape sustaining material to act as an outer guide for a movable vehicle window. A second generally U-shaped member is formed separately from the first U-shaped member and has a pair of legs which are spaced sufficiently to receive the inner wall of the first U-shaped member and a mounting flange so as to clamp the inner wall to the mounting flange. A sealing lip is mounted to the second U-shaped member and extends toward the outer wall of the first U-shaped member when the inner wall is received between the pair of legs. The second U-shaped member may comprise a hard, flexible core covered with a softer material.

The first generally U-shaped member may comprise a plastic shape sustaining material. Alternatively, the first generally U-shaped member may also comprise a hard, flexible core covered with a softer material.

A plurality of the first U-shaped members may be formed as a single modular unit to enclose three sides of the movable window opening. A plurality of second U-shaped members may be attached individually to the modular unit to form a complete sealing element for the movable window.

The first generally U-shaped member may also have an external mounting flange formed integrally and trim elements glued or otherwise attached to the external mounting flange. The external mounting flange may be attached to a recess in the vehicle body to aid in the flush mounting of the window.

An alternative form of the sealing element may comprise a one piece construction having an S-shape wherein one portion of the S is formed of a hard plastic material and the other portion of the S is formed of a metal core with a soft covering. This form of the sealing element may be manufactured using a dual extrusion process.

BRIEF DESCRIPTION OF THE DRAWINGS

The above and other objects will become more readily apparent as the invention is more fully understood from the detailed description to follow, reference being had to the accompanying drawings in which like reference numerals represent like parts throughout, and in which.

DETAILED DESCRIPTION OF THE PREFERRED EMBODIMENT

Figure 1:
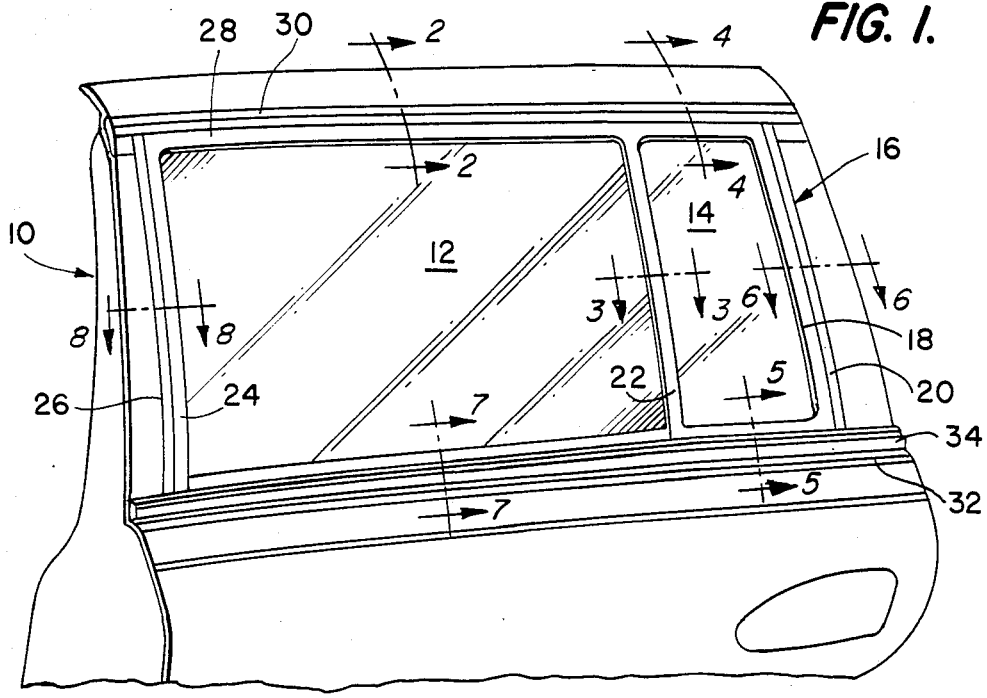
FIG. 1 is a perspective view of a vehicle door having flush mounted windows and a modular sealing element according to the present invention.

FIG. 1 shows a vehicle door 10 incorporating a modular sealing element system according to the present invention. Door 10 is shown to be a rear door having a vertically slidable window 12 and a fixed window 14. A one piece molded outer sealing unit 16 surrounds both windows. The sealing unit 16 includes a first vertical portion 18 which mounts a first trim member 20, a second vertical portion 22, and a third vertical portion 24, which mounts a trim member 26. The sealing unit 16 also includes a horizontal portion 28 which mounts a trim member 30 and a second horizontal portion 32 which mounts a trim member 34. The horizontal portions 28 and 32 are shown to extend for the entire length of the door 10.

Sealing unit 16 is molded from any suitably hard material such as polyurethane, thermoset plastic or the like. After manufacture, the trim elements 20, 26, 30 and 34 may be conveniently mounted, as will be described hereinbelow, and the unit can be mounted to the door. The unit 16 is formed to fit into recesses in the door, as will become apparent below.

Sealing unit 16 is suited to being mounted by automated equipment since it is rigid and can be installed by moving it normally into the window opening. Unit 16 is held in place by glue against a mounting flange and the door sheet metal. Additional sealing members are then added inside.

It will be noted that while unit 16 is shown to be configured to attach to the rear door of a vehicle, the present invention is applicable to any vehicle opening in which sliding windows are present. In particular, the invention can be used for a front door in which case the housing for an external rear view mirror attached to the door can be formed unitarily with the unit 16. In other words, unit 16 can be formed to include fixed window frames, mirror housings, trim molding mounts, window trim, etc. This type of construction greatly facilitates manufacture of the vehicle door since the unit 16 can be preformed and glued (as will be discussed in greater detail below) in place with all of the necessary door and window pieces already attached.

Figure 2:
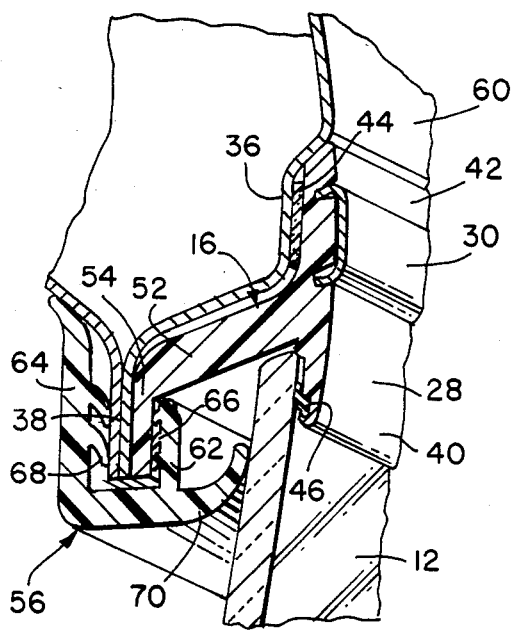
FIG. 2 is a sectional view taken along line 2—2 of FIG. 1.

FIG. 2 shows the upper horizontal portion 28 in greater detail. As can be seen in FIG. 2, the sheet metal of the door has an indentation 36 and terminates in a flange 38 formed by inner and outer door structural members. Flange 38 is recessed from indentation 36.

The horizontal portion 28 of unit 16 includes a lower flange 40 and an upper flange 42. Lower flange 40 acts as a window guide to rigidify the window and keep it from moving outwardly in the window opening. Upper flange 42 mounts trim strip 30 which can be glued or otherwise held in place. Upper flange 42 is received in recess 36 and may be glued in place by the use of double sided tape 44 or the like.

Since unit 16 is formed form a relatively rigid material, it is necessary to utilize a softer material to form a sealing lip 46 which extends inwardly from flange 40 to contact movable window 12. There are several alternate methods for adding the sealing lip 46, as will be discussed below.

Portion 28 extends inwardly at 52 to form the upper part of the window frame and then extends downwardly to form a flange 54 which runs parallel to flange 38. Flange 54 may be glued to flange 38 to stabilize unit 16.

The purpose of the present invention is to enable window 12 to be essentially flush mounted and for the vehicle exterior surface to be essentially smooth. Accordingly, the thickness of upper flange 42 must be approximately the same as the depth of recess 36 so that its outer surface forms a continuation of the outer surface 60 of the door. Also, lower flange 40 must be sufficiently thin to enable window 12 to be substantially flush mounted yet must be sufficiently thick to provide the rigid support required. It has been found that by reaction injection molding polyurethane to form unit 16 with a hardness of 100 Durometer on the shore D scale and by making the flange 40 with a thickness of approximately 0.09 inch, the desired flush mounting can be achieved as well as the desired structural rigidity. The flange 40 will be able to flex slightly but will be rigid against outward movement of window 50.

A sealing member 46 is applied over flanges 38 and 54. Member 56 is generally U-shaped and has legs 62 and 64 having flexible fingers 66 and 68, respectively, which apply a force holding flange 54 and flange 38 together. A flexible sealing lip 70 extends from the bottom of leg 62 and seals against the inside surface of window 12.

Sealing lips 46 and 70 may be flocked as is conventional to enhance the sealing effect and reduce friction. The outer surface of member 56 may be covered with material, colored or the like in order to act as an interior trim element.

Figure 3:
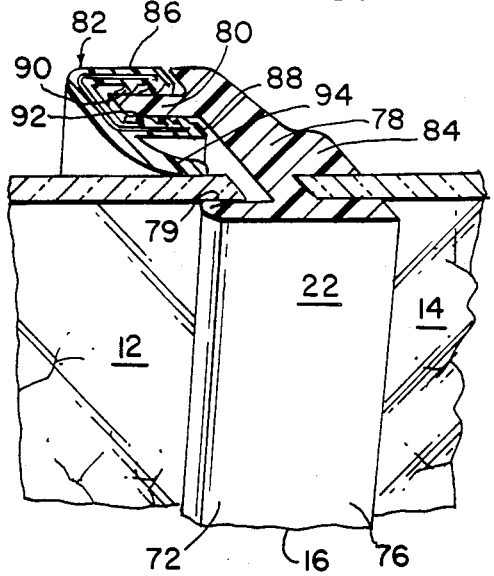
FIG. 3 is a sectional view taken along line 3—3 of FIG. 1.

FIG. 3 shows the vertical portion 22 in greater detail. It will be seen that this portion of unit 16 includes a flange 72 with a sealing lip 74 pressed against window 12. A flange 76 extends over the outer surface of fixed window 14. A portion 78 extends inwardly of the vehicle and contains a flange 80 which mounts an inner sealing member 82. Portion 78 also includes an enlarged member 84 which, together with flange 76 forms a channel which receives the fixed window 14. Window 14 may be glued or otherwise held within this channel.

Sealing member 82 is similar to sealing member 56 of FIG. 2. Sealing member 82 includes a U-shaped portion comprising legs 86 and 88 with gripping fingers 90 and 92, respectively. However, gripping fingers 90 and 92 only grasp flange 80 since there is no door sheet metal at this position. Sealing member 82 also includes a flexible sealing lip 94 which is biased against the inner surface of window 12 to complete the vertical window seal.

As can be seen in FIG. 3, the window frame for fixed window 14 as well as the outer guide for movable window 12 are integrally formed with the modular unit 16. Again, flocking is used where appropriate such as on the sealing lips 74 and 94 and the outer surface of sealing member 82 may be made decorative so as to provide an inner trim member on the vehicle door.

Figure 4:
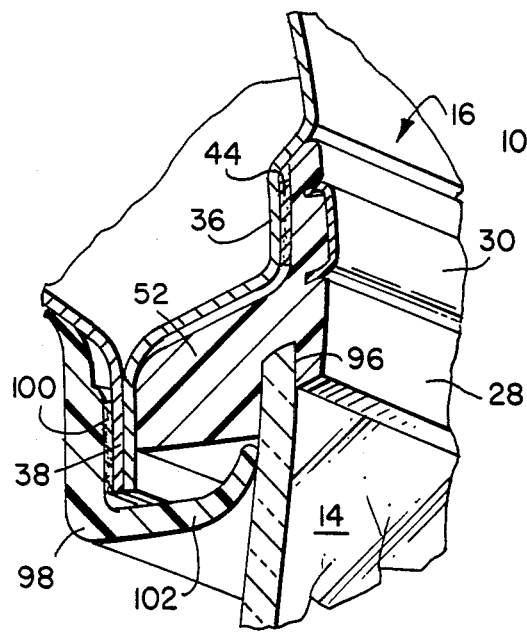
FIG. 4 is a sectional view taken along line 4—4 of FIG. 1.

FIG. 4 shows the details of the upper horizontal portion 28 over the fixed window 14. As can be seen, portion 28 has a contour which matches the contour of the sheet metal of the vehicle door and is glued to the vehicle sheet metal at recess 36 by double sided tape 44. Also, glue is used to hold the innermost portion 52 against flange 38. However, in this section of the modular unit 16, portion 52 is wide enough to cover the inner surface of window 14 so that window 14 is received in a slot 96. A trim piece 98 is glued over the opposite side of flange 38 by double sided tape 100. Trim piece 98 has a lip 102 which is pressed against the inner surface of window 14.

Figure 5:
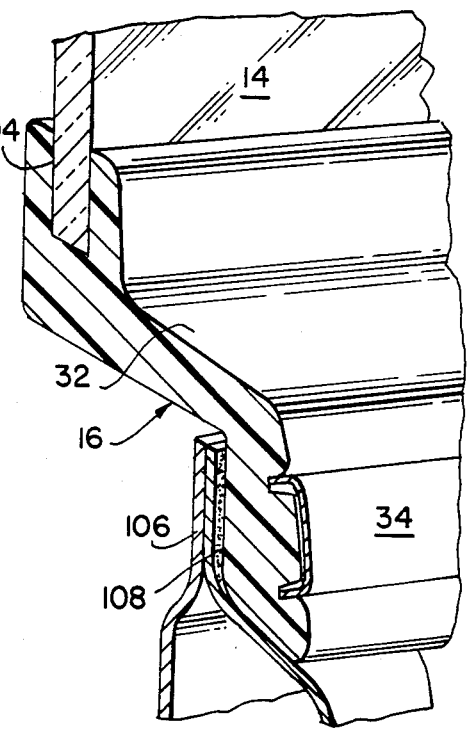
FIG. 5 is a sectional view taken along line 5—5 of FIG. 1.

FIG. 5 shows the lower mounting of window 14. Again, the window is received in a slot. The slot 104 is formed in the lower portion 32 of unit 16. In this case, the design of the door calls for portion 32 to bend inwardly from the door flange 106 which is formed by the inner and outer door sheet metal pieces meeting and being joined in a conventional manner. The lowermost part of portion 32 extends over flange 106 and may be held in place by glue at 108.

Figure 6:
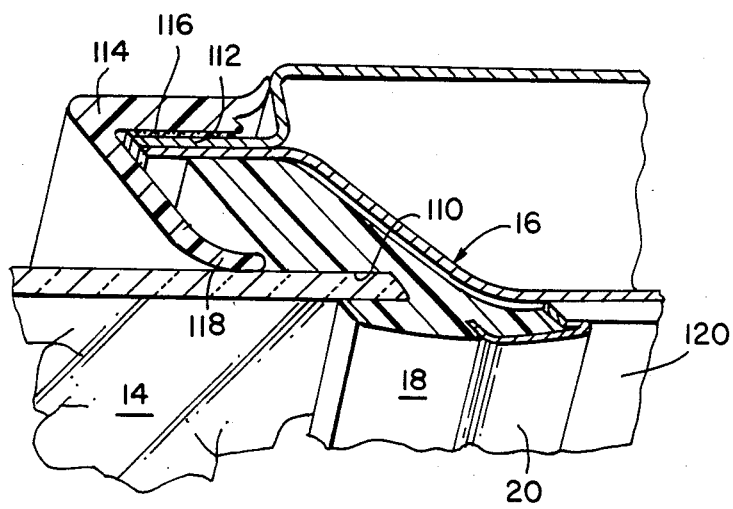
FIG. 6 is a sectional view taken along line 6—6 of FIG. 1.

FIG. 6 shows the right-hand edge of window 14 mounted in a slot 110 formed in the vertical portion 18. Portion 18 extends inwardly to abut against a flange 112 formed by the inner and outer door sheet metal pieces. An inner trim element 114 is glued to flange 112 by double sided tape 116 and includes a flexible end portion 118 which abuts against the inner surface of window 14. In FIG. 6 it will be seen that the trim element 20 extends over another trim element 120 which is mounted on the back edge of the door.

Figure 7:
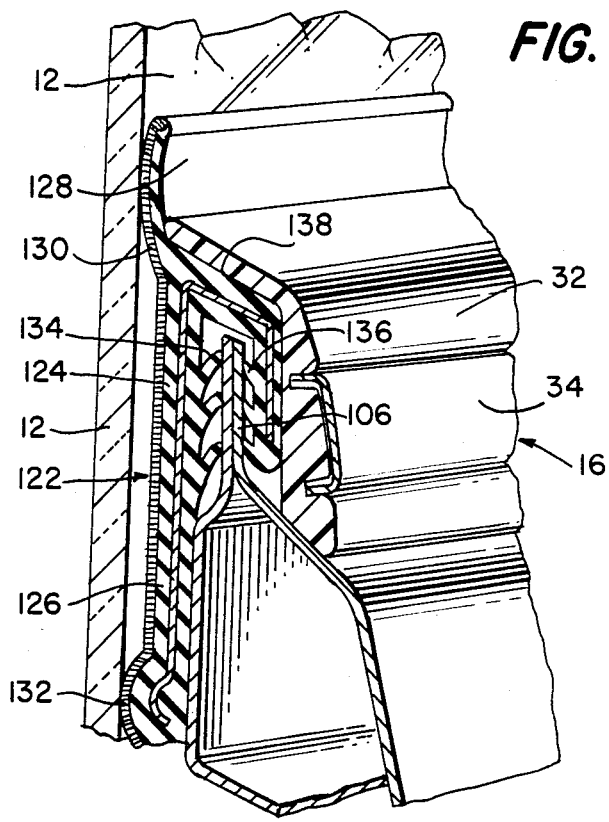
FIG. 7 is a sectional view taken along line 7—7 of FIG. 1.

FIG. 7 shows the lower horizontal portion 32 of the modular unit 16. The portion 32 covers a belt seal member 122. The belt seal 112 comprises a U-shaped metal core 124 which is coated with rubber 126 or other soft, pliable material. The coating 126 may be extruded onto the core 124 with an upwardly extending sealing lip 128 being formed during the extrusion process. Flocking 130 is applied over the entire surface of the belt seal 122 facing the window 12. It will be noted that a lower bulge 132 is formed on the belt seal 122 which also contacts the window 12. It will also be noted that gripping fingers 134 and 136 are formed on the belt strip to hold it onto the flange 106.

The horizontal portion 32 of the modular member 16 has an inner surface 138 which conforms to the shape of the outer surface of belt seal 122 so that it may be laid upon the belt seal 122 in a convenient manner. Preferably, the horizontal portion 32 is glued to the belt seal 122.

Figure 8:
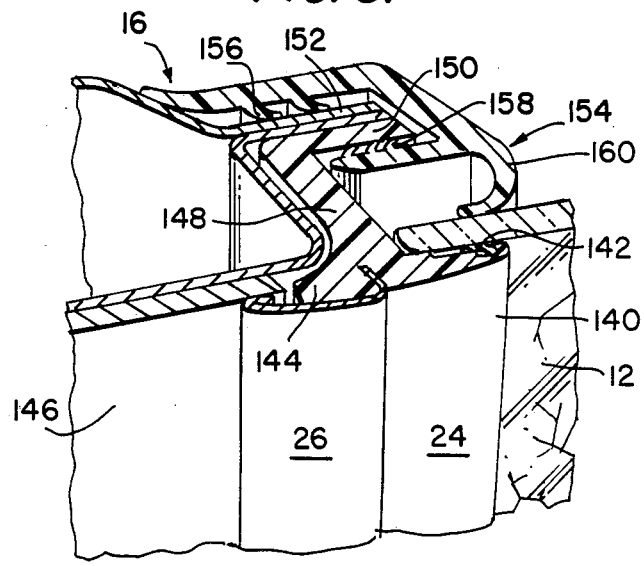
FIG. 8 is a sectional view taken along line 8—8 of FIG. 1.

FIG. 8 shows the left hand edge of movable window 12 and the left vertical portion 24 of modular member 16. Vertical portion 24 includes a forwardly extending flange 140 which acts as a window guide. A sealing lip 142 is mounted in flange 140 and contacts the window 12 to provide a weather seal. A forwardly extending portion 144 mounts the trim piece 26 which extends over an additional trim piece 146 which is on the forward edge of the door. Portion 24 extends inwardly at 148 to follow the contour of the door sheet metal and contains a terminating flange 150 which is positioned alongside flange 152 of the door. Flanges 150 and 152 are glued together. A sealing member 154 has a U-shaped portion containing gripping fingers 156 and 158 which grasp onto the glued flanges 150 and 152. A sealing lip 160 extends toward and contacts window 12. The sealing lip 160 may be flocked as in conventional to assist in reducing friction against the window 12. The entire outer surface of sealing member 154 may be colored or decoratively coated to provide an inner trim element.

It will be understood that the embodiment of the invention shown in FIGS. 1 through 8 has the advantage that virtually the entire outer framework of the window can be manufactured in a single molding step to form modular unit 16. Alternatively, the portions of modular unit 16 can be formed and used individually. The individual portions retain certain advantages which are derived from the basic construction of these pieces. In particular, the two piece construction discussed with reference to FIGS. 2 and 8 is particularly advantageous. This construction is shown in more detail in FIG. 9 wherein a flange 162 is shown formed from two layers of sheet metal which are connected together in a conventional manner. The outer piece 164 of the two piece seal construction comprises a U-shaped member having a metal core 166 covered preferably with rubber to form a covering 168. A sealing lip 170 is formed integrally with the covering 168. Flocking 172 is disposed along the inside surface of the coating 168 and on the sealing lip 170.

The metal core 166 is preferably a corrosion resistant metal such as aluminum which can either be stamped or stretch formed. The metal core should be slightly flexible but sufficiently rigid to sustain an outer pressure produced by movement of the window 176. A flexible rubber edge piece 178 is also formed with the coating 168 to fill any gap between member 164 and the sheet metal.

The second member of the two piece construction is a clamping member 180 which is also U-shaped and has a metal core 182. Core 182, like core 166, is formed of a corrosion resistant metal. A rubber coating 184 is applied over the core 182. Gripping fingers 186 and 188 are formed integrally with the rubber coating 182 as is sealing lip 190. Flocking 192 is applied to the surface of sealing lip 190 which contacts the window 176.

Cores 166 and 182 may be ribbed or perforated, as shown, in order to increase flexibility so that the two piece seal may be bent around corners. Alternatively, if the seal is to be preformed to the desired opening, the cores may be rigid and inflexible.

To apply the two piece seal to a vehicle opening, the member 164 is first held in place with glue being applied between one leg of the U-shaped structure and flange 162. The member 180 is then pushed on so that fingers 186 and 188 grip the flange 162 and the attached leg of member 164.

Figure 10:
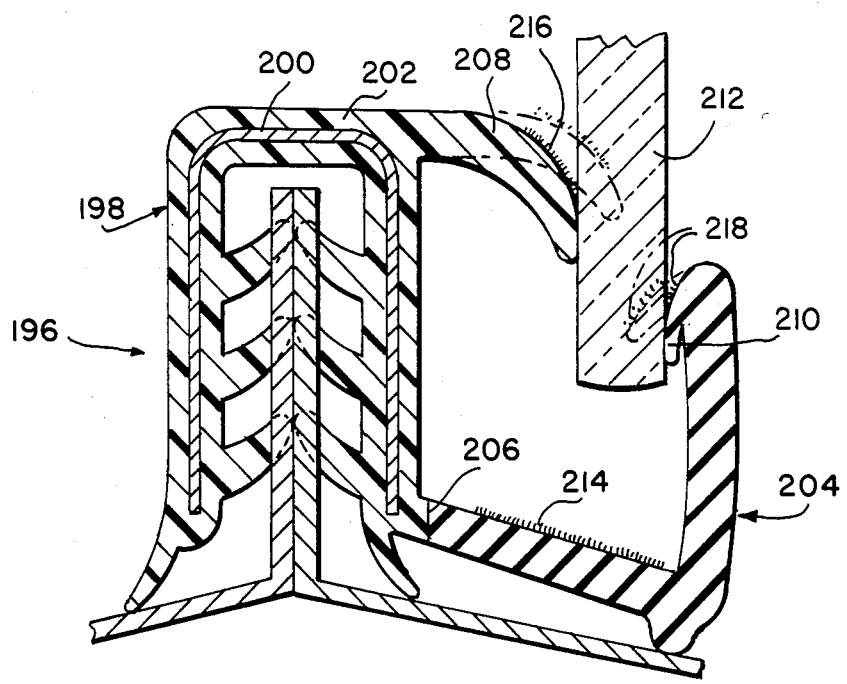
FIG. 10 is a sectional view showing the construction details of a one piece sealing element according to the present invention.

FIG. 10 shows a one piece sealing element 196 which comprise a generally S-shaped member having a first portion 198 which includes a metal core 200 formed in a U-shape. Core 200 has a covering 202 formed of a relatively soft material such as polyurethane with a hardness of approximately 60 Durometer on the shore B scale. A second member 204 is formed with an L-shape and attached to the coating 202 at the junction 206. Member 204 can be formed of a harder material such as polyurethane with a hardness of 100 Durometer. Sealing lips 208 and 210 attach to covering 202 and member 204, respectively. It is noted that the sealing lips 208 and 210 are shown both in their positions with window 212 pressed against the sealing lips and in their relaxed positions. Flocking 214 can be applied to the inner surface of member 204 and flocking 216 and 218 can be applied to the sealing lips 208 and 210, respectively.

The one piece sealing element 196 can be formed by coextrusion wherein the covering 202 is extruded over metal core 200 and the member 204 is extruded simultaneously so as to form a permanent bond at junction 206.

FIG. 10 shows the sealing lip 210 formed integrally with member 204. In fact, however, it is preferable for the sealing lip to be substantially softer than 100 Durometer. In fact, it is preferable to have a sealing lip formed of rubber rather than polyurethane.

Figure 11:
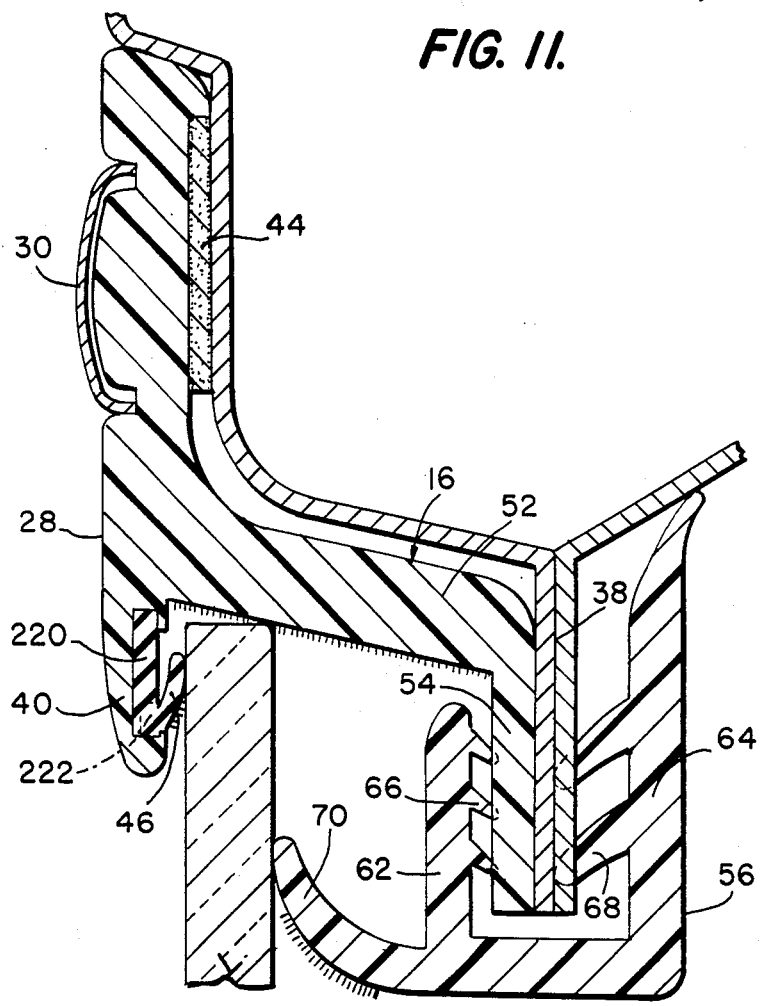
FIG. 11 is a sectional view showing a two piece sealing element according to the present invention with a flexible sealing lip and trim molding in the outer member of the sealing element.

FIG. 11 shows a two piece seal similar to that of FIG. 2. In FIG. 11, elements similar to those in FIG. 2 have corresponding reference numerals. In FIG. 11, it will be seen that sealing lip 46 is a separate element which is embedded in flange 40. The sealing element may be an extruded rubber piece with flocking and is formed integrally with a base member 220. Alternatively, a smaller base member shown in phantom at 222 may be used. In either case, the sealing lip 46 with its base member is extruded separately from the molded flange 40. Flange 40 is formed by reaction injection molding integrally with the remainder of unit 16. In order to attach sealing lip 46 with its base member, the sealing lip is mounted in the mold which receives the molding material. The molding material is preferably polyurethane. Accordingly, the member 16 is molded around the sealing lip 46 with its base member so that the sealing lip is held firmly in place. The details of reaction injection molding as well as the molds used therein are well known and will not be discussed herein.

Figure 12:
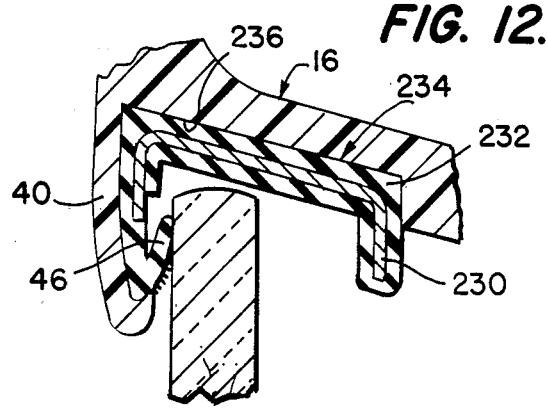
FIG. 12 is a fragmentary view showing the sealing element of FIG. 11 with an alternate sealing lip construction.

FIG. 12 shows an alternate embodiment wherein the sealing lip 46 is extruded onto a metal core 230. Core 230 is generally U-shaped and is covered with a rubber coating 232. The sealing lip 46 is integral with this rubber coating. The rubber coating, sealing lip and metal core form an insert 234. When the unit 16 is molded, an indentation 236 is formed into which the insert 234 fits. Insert 234 is then attached during a post-assembly process by gluing into place. In this form of the invention, a separate, flexible sealing lip is provided. Also, additional rigidity is obtained by the metal core 230.

As will be readily apparent, the techniques discussed relative to FIGS. 11 and 12 for adding sealing lips can be applied to any of the other embodiments of the invention. These attachment techniques are most useful where the body of the member is formed of a hard material such as 100 Durometer polyurethane. This type of material is used when no metal core is present. Alternatively, as shown in FIG. 9, metal cores may be provided in both parts of a two part sealing member such that the sealing lip does not need to be formed of a different material from that which coats the metal cores.

Figure 9:
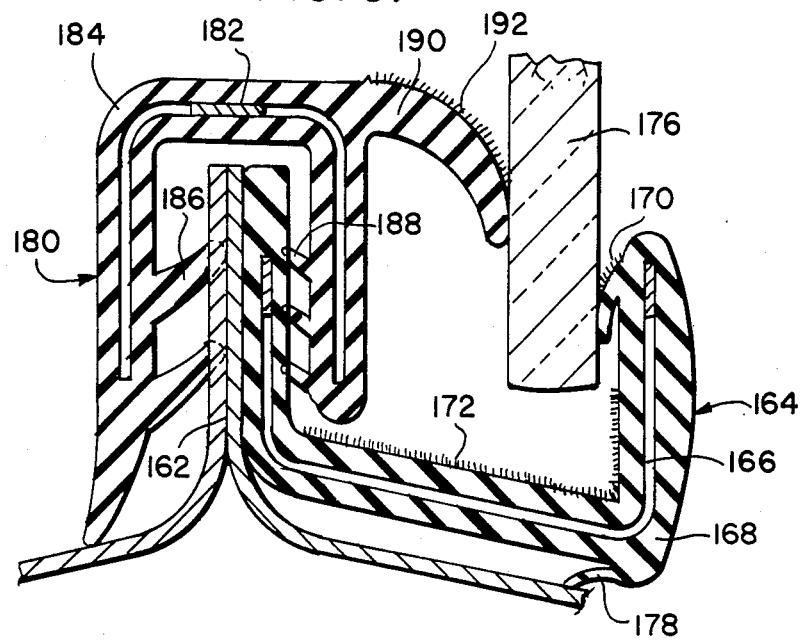
FIG. 9 is a sectional view showing the construction details of a two piece sealing element according to the present invention.

Normally, the U-shaped member which provides the clamping action, such as member 108 of FIG. 9 will have a metal core in order to provide a proper clamping effect. Accordingly, the sealing lips on these members may be extruded along with the coating material, which is normally of rubber.

The foregoing description is set forth for purposes of illustrating the present invention but is not deemed to limit its scope. Clearly, numerous additions, substitutions and other changes may be made to the present invention without departing from the scope thereof, as set forth in the appended claims.

What is claimed is:

1. A sealing element for a flush-mounted window in an automobile, comprising:
    a first generally U-shaped member having an outer wall and an inner wall, said outer wall being shaped sustaining to form an outer guide for a movable vehicle window; and
    a second generally U-shaped member having a pair of legs, said second U-shaped member being separate from said first U-shaped member and said pair of legs being spaced by a distance sufficient to receive said inner wall of said first U-shaped member, and a sealing lip mounted to said second U-shaped member and extending toward said outer leg of said first U-shaped member when said inner leg is received between said second pair of legs.

2. A sealing element as claimed in claim 1 wherein said second generally U-shaped member comprises a hard, flexible core covered with a softer material.

3. A sealing element as claimed in claim 2 wherein said first generally U-shaped member comprises a plastic shape sustaining material.

4. A sealing element as claimed in claim 2 wherein said first generally U-shaped member comprises a hard, flexible core covered wtih a softer material.

5. A sealing element as claimed in claim 1 wherein said first generally U-shaped member is part of a modular, integral unit surrounding said window opening on three sides.

6. A sealing element as claimed in claim 5 wherein said modular unit comprises a molded plastic member.

7. A sealing element as claimed in claim 5 including trim members mounted on said modular unit.

8. A sealing element as claimed in claim 5 wherein said modular unit includes structural features associated with components other than said sliding window.

9. A sealing element as claimed in claim 8 wherein said structural features include a slot mounting a fixed window.

10. A sealing element as claimed in claim 1 including a second sealing lip mounting on outer wall of said first U-shaped member.

11. A sealing element as claimed in claim 10 wherein said second sealing lip is an extruded piece molded into said first U-shaped member.

12. A sealing element as claimed in claim 10 wherein said second sealing lip is connected to a second sealing lip structure which is glued in place in said first generally U-shaped member.

13. A sealing element as claimed in claim 12 wherein said second sealing lip structure comprises a generally U-shaped hard core covered with a softer material forming said second sealing lip.

14. A sealing element as claimed in claim 1 in combination with a mounting flange in said opening, wherein said inner wall is disposed adjacent said mounting flange and said second U-shaped member is disposed over said inner wall and said mounting flange.

15. A sealing element as claimed in claim 14 wherein said inner wall is glued to said mounting flange.

16. A sealing element for a flush mounted window of an automobile, comprising an S-shaped member having two integral portions, one of said portions being generally U-shaped and comprising a hard core member surrounded by a softer material, the other of said portions comprising a coreless hard plastic material connected to said softer material, said second portion including a generally rigid wall forming an outer guide for a movable window.

17. A sealing element as claimed in claim 16 including a sealing lip attached to said generally rigid wall, said sealing lip being formed of said softer material.

18. A sealing element as claimed in claim 17 wherein said softer material of said U-shaped portion includes a sealing lip extending toward said first mentioned sealing lip.

19. A sealing element as claimed in claim 16 wherein said core is a corrosion resistant metal.

20. A method of forming a sealing element for a flush mounted automobile window, comprising:
    molding an outer unitary seal member including an outer guide wall for at least three sides of a movable window opening;
    gluing said unitary member in place in a window opening; and
    applying separate, inner seal members along an inner edge of said unitary outer seal member.

21. A method as claimed in claim 20 including forming said unitary seal member with an inner flange, and wherein said gluing step comprises gluing said inner flange to a flange surrounding said opening, and said step of applying an inner seal member comprises forming said inner seal member in a U-shaped and applying said U over said glued together flanges.

22. A method as claimed in claim 20 wherein said unitary member is rigid and is applied to said opening by moving said integral member normally of said opening into said opening.

* * * * *